United States Patent [19]

Krapcho et al.

[11] 3,925,384

[45] Dec. 9, 1975

[54] 2-AMINO-4,5-DIHYDRO-4-ARYLINDENO PYRIMIDINES

[75] Inventors: John Krapcho, Somerset; Chester Frank Turk, Kendall Park, both of N.J.

[73] Assignee: E. R. Squibb & Sons, Inc., Princeton, N.J.

[22] Filed: Oct. 21, 1974

[21] Appl. No.: 516,306

[52] U.S. Cl........ 260/256.4 Q; 260/590; 260/240 R; 424/251
[51] Int. Cl.² .................................. C07D 239/70
[58] Field of Search .......................... 260/256.4 Q

[56] References Cited
UNITED STATES PATENTS

| | | | |
|---|---|---|---|
| 3,257,400 | 6/1966 | Wagner | 260/256.4 Q |
| 3,322,759 | 5/1967 | Carney et al. | 260/256.4 Q |
| 3,346,452 | 10/1967 | Carney et al. | 260/256.4 Q |

*Primary Examiner*—Nicholas S. Rizzo
*Assistant Examiner*—David E. Wheeler
*Attorney, Agent, or Firm*—Lawrence S. Levinson; Merle J. Smith; Stephen B. Davis

[57] ABSTRACT

Compounds of the formula

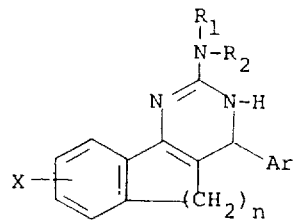

and the pharmaceutically acceptable acid-addition salts and N-oxides thereof wherein X is hydrogen, halogen, alkyl, alkoxy, or trifluoromethyl; $n$ is 1, 2 or 3; Ar is X-substituted phenyl, pyridyl, or thienyl; and $R_1$ and $R_2$ are hydrogen or alkyl are disclosed. These compounds are useful as anti-inflammatory agents.

9 Claims, No Drawings

2-AMINO-4,5-DIHYDRO-4-ARYLINDENO PYRIMIDINES

SUMMARY OF THE INVENTION

This invention relates to new compounds of the formula:

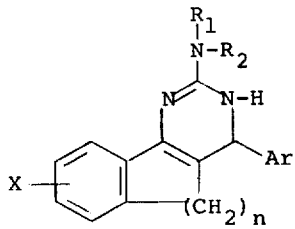

I and the pharmaceutically acceptable acid-addition salts and N-oxides thereof which have been found to exhibit anti-inflammatory activity when administered to mammalian species.

X represents hydrogen, halogen, preferably Cl or F, alkyl of 1 to 3 carbons, alkoxy of 1 to 3 carbons, or trifluoromethyl.

Ar represents X-substituted phenyl wherein X is as defined above,

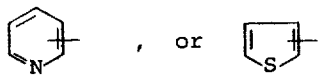

$n$ is 1, 2 or 3.

$R_1$ and $R_2$ are independently selected from hydrogen and straight or branched chain alkyl of 1 to 4 carbons. However, when both $R_1$ and $R_2$ are alkyl, the alkyl radicals are straight chain of 1 to 4 carbons.

The term "alkyl" is intended to include both straight and branched chain radicals, as for example, methyl, ethyl, propyl, isopropyl, butyl, t-butyl, etc. The term "alkoxy" includes such alkyl groups attached to an oxygen atom, i.e. methoxy, ethoxy, propoxy, isopropoxy.

The term "acid addition salts" is intended to mean salts which may be formed for the purposes of isolation, purification, and storage, such as the oxalate salt, picric salt, etc. and pharmaceutically acceptable salts meant for administration of the compound to a host, such as the hydrochloride, sulfate, acetate, maleate, citrate salts, etc.

The N-oxide may be formed by dissolving the free base of formula I in a solvent inert to hydrogen peroxide, e.g., ethanol or chloroform, adding excess (on a molar basis) hydrogen peroxide, and allowing the mixture to stand at room temperature for several hours. An acid-addition salt of the N-oxide may be formed by addition of the desired acid, for example, those mentioned above.

DETAILED DESCRIPTION OF THE INVENTION

The new compounds of formula I are prepared by reacting a ketone of formula II, wherein X, $n$ and Ar are as defined above,

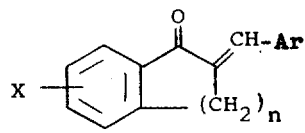

II with a compound of formula III, wherein $R_1$ and $R_2$ are as defined above;

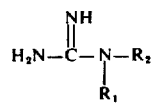

III

The reaction takes place by refluxing the ketone of formula II and the compound of formula III in an aliphatic alkanol solvent of from 1 to 5 carbons, preferably methanol, at a temperature of from about 40°C to about 120°C, preferably at about the reflux temperature of the solvent, for from about ½ hour to about 12 hours, preferably for from about 2 to about 6 hours. Compound of formula III may be employed in the form of an acid salt, preferably the hydrochloride salt, in which case sodium methoxide is included within the reaction mixture.

The starting compounds of formula II may be prepared by reacting a phenylalkanoic acid of the formula

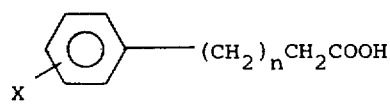

with polyphosphoric acid by known methods, or with $SOCl_2$ followed by $AlCl_3$ by known methods to produce a ketone of the formula

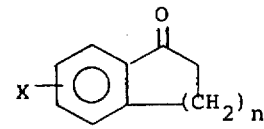

which is then reacted with an aldehyde of the formula

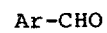

to yield the starting compounds of formula II. The latter reaction takes place by reacting the ketone and aldehyde in a polar organic solvent, preferably an aliphatic alkanol of from 1 to 5 carbons or dimethylformamide, at lowered temperatures of from about 0°C to about −25°C, preferably in the presence of an alkali.

Preferred are the compounds of formula I wherein:
X is hydrogen, Cl, F, $CH_3$, $CH_3O$, or $CF_3$.
Ar is X-substituted phenyl wherein X is as defined above.
$R_1$ and $R_2$ are independently selected from hydrogen, methyl and ethyl.

Most preferred are the compounds wherein:
X is hydrogen.
$n$ is 1 or 2.
Ar is phenyl.
$R_1$ and $R_2$ are both hydrogen.

The compounds of formula I including the pharmaceutically acceptable acid-addition salts and N-oxides are useful in treating inflammation in mammalian species, e.g. rats, cats, dogs, monkeys, etc. Joint tenderness and stiffness (in conditions such as rheumatoid arthritis) are relieved by the above described compounds.

The compounds of this invention are formulated for use as anti-inflammatory agents according to accepted pharmaceutical practice in oral dosage forms such as tablets, capsules, elixirs, or powders, or in an injectable form in a sterile aqueous vehicle prepared according to conventional pharamceutical practice. The compounds of this invention may be administered in amounts ranging from about 0.3 mg. to about 30 mg. per kg. of body weight per day, preferably from about 0.7 mg. per kg. to about 3.0 mg. per kg. per day in single or divided doses.

The following examples are specific embodiments of this invention. All temperatures are expressed on the Centigrade scale.

EXAMPLE 1

4,5-Dihydro-4-phenyl-3H-indeno[1,2-d]pyrimidin-2-amine, hydrochloride (1:1)

a. 2-(Phenylmethylene)-1-indanone

A mixture of 100 g. of indanone, 80.0 g. of benzaldehyde and 500 ml. of ethanol is stirred, the resulting solution is cooled to −10° and treated rapidly (3 min.) with a solution of 5.0 g. of KOH in 100 ml. of ethanol. The temperature is kept below 15° during this exothermic reaction. The solution is then allowed to warm and the product begins to crystallize at 17°. The resulting slurry is allowed to stir at 20°–25° for 1 hour, and then poured onto 2 liters of ice-water. After standing for 3 hours, the solid is filtered, washed with cold water and allowed to air dry; wt., 161.3 g. (96%), m.p. 101°–103°. Since a small amount of dimeric condensation product formed is not removed by crystallization, part of the solid material (150 g., in three portions) is distilled through a short-path apparatus to give 139.0 g. of yellow distillate; b.p. 175°– 180° (0.01 mm.). The distillate rapidly solidifies and is crystallized from 350 ml. of ethanol to give 128.4 g. (83%) of pale yellow product, m.p. 106°–109°.

b.
4,5-Dihydro-4-phenyl-3H-indeno[1,2-d]pyrimidin-2-amine, hydrochloride (1:1)

5.5 g. (0.025 mole) of 2-(phenylmethylene)-1-indanone from part (a) and 2.7 g. (0.028 mole) of guanidine hydrochloride in 80 ml. of methanol are treated with 1.6 g. (0.03 mole) of sodium methoxide. The mixture is refluxed for 4 hours, cooled, filtered to removed sodium chloride, and the methanol is removed by use of a rotary evaporator to give 8.2 g. of a tan, brittle residue. This residue is extracted with 240 ml. of boiling acetonitrile and an insoluble fraction (3 g.) is removed by filtration. The cooled filtrate is treated with 4.2 ml. of 6.0 N alcoholic HCl. The color lightens from red amber to yellow and on rubbing the crystalline HCl salt separates. After cooling overnight, the yellow material is filtered, washed with acetonitrile and ether, and dried in vacuo to yield 2.3 g. of product; m.p. 221°–223°. Crystallization from 5 ml. of hot DMF – 15 ml. of acetonitrile yields 2.0 g. of yellow solid 4,5-dihydro-4-phenyl-3H-indeno[1,2-d]pyrimidin-2-amine, hydrochloride (1:1); m.p. 221°–223°.

EXAMPLE 2

3,4,5,6-Tetrahydro-4-phenylbenzo[h]quinazolin-2-amine, hydrochloride (1:1)

a.

3,4-Dihydro-2-(phenylmethylene)-1(2H)-naphthelenone

A solution of 115 g. of α-tetralone and 80.0 g. of benzaldehyde in 500 ml. of ethanol is stirred, cooled to −10°, and treated with a solution of 5.0 g. of KOH in 100 ml. of ethanol. The cooling bath is removed and the solution allowed to warm to room temperature — a crystalline product begins to separate at 22°. After standing overnight at room temperature, the mixture is poured onto 2 liters of ice-water. This product is filtered, washed with cold water and allowed to dry overnight; wt., 171 g., m.p. 100°–102°. Distillation of this material (in 3 portions) gives 167 g. of pale yellow distillate; b.p. 180°–185° (0.01 mm.). After crystallization from 250 ml. of ethanol, the pale yellow product weighs 158 g. (90%); m.p. 103°–105°.

b.
3,4,5,6-Tetrahydro-4-phenylbenzo[h]quinazolin-2-amine, hydrochloride (1:1)

11.7 g. (0.05 mole) of 3,4-dihydro-2-(phenylmethylene)-1(2H)-naphthalenone from part (a), 5.4 g. (0.057 mole) of guanidine hydrochloride in 160 ml. of methanol are treated with 3.2 g. (0.059 mole) of sodium methoxide. The mixture is refluxed for 4 hours, cooled, filtered to remove sodium chloride, and the methanol is removed by use of a rotary evaporator to give 18.3 g. of foamy orange-red residue. This residue is dissolved in 200 ml. of boiling acetonitrile, filtered, cooled, and treated with 7 ml. of 7.1 N alcoholic HCl. The hydrochloride salt separates as an oil which crystallizes on rubbing and cooling overnight to yield 10.7 g. of yellow solid; m.p. 238°–240° (s. 235°). Crystallization from 80 ml. of warm methanol – 120 ml. of ether yields 6.0 g. of pale yellow 3,4,5,6-tetrahydro-4-phenylbenzo[h]quinazolin-2-amine, hydrochloride (1:1); m.p. 267°–269° (s. 259°).

EXAMPLE 3

4-(4-Chlorophenyl)-4,5-dihydro-3H-indeno[1,2-d]pyrimidin-2-amine, hydrochloride (1:1)

a. 2-(4-Chlorophenylmethylene)-1-indanone

A mixture of 100 g. (0.76 moles) of indanone, 112 g. (0.8 mole) of 4-chlorobenzaldehyde and 500 ml. of ethanol is stirred and heated to 30°. The resulting solution is cooled to 0° using a dry-ice bath and treated rapidly (3 min.) with a solution of 5 g. of KOH in 100 ml. of ethanol. The temperature rises to 8° and the mixture begins to crystallize to give a heavy mass. After standing overnight at room temperature, the mixture is poured onto 2 liters of ice-water. The solid is filtered, washed with water, and allowed to dry to yield 190 g. of product; m.p. 174°–176°. This product is purified by crystallization from 400 ml. of dimethylformamide to yield 164.5 g. of cream-colored 2-(4-chlorophenylmethylene)-1-indanone; m.p. 177°–179°.

b.
4-(4-Chlorophenyl)-4,5-dihydro-3H-indeno[1,2-d]pyrimidin-2-amine, hydrochloride (1:1)

12.7 g. (0.05 mole) of the 2-(4-chlorophenylmethylene)-1-indanone from part (a) is reacted with 5.4 g. (0.057 mole) of guanidine hydrochloride and 3.2 g. (0.059 mole) of sodium methoxide in 250 ml. of methanol as set forth in example 1(b). After standing overnight, the crystalline solid which separates is filtered and washed with methanol. The methanol filtrate is evaporated to give 14.0 g. of a dark brown gummy residue. This residue is extracted with 500 ml. of warm acetonitrile, filtered to remove an insoluble fraction, and the filtrate is cooled, stirred and treated with 7.2 ml. of 6.9 N alcoholic HCl. The color lightens and on rubbing, the HCl salt initially separates as a tacky solid which crystallizes on further rubbing and cooling overnight to yield 4.8 g. of pale yellow solid; m.p. 240°–242° (s. 234°). Crystallization from 80 ml. of warm methanol – 220 ml. of ether yields 3.5 g.; m.p. 263°–265° (s. 257°). Recrystallization from 60 ml. of warm methanol – 160 ml. of ether yields 2.8 g. of pale yellow 4-(4-chlorophenyl)-4,5-dihydro-3H-indeno[1,2-d]pyrimidin-2-amine, hydrochloride (1:1); m.p. 268°–270° (s. 260°).

EXAMPLE 4

4,5,6,7-Tetrahydro-4-phenyl-3H-benzo[6,7]cyclohepta[1,2-d]-pyrimidin-2-amine, hydrochloride (1:1)

a.
6,7,8,9-Tetrahydro-6-(phenylmethylene)-5H-benzocyclohepten-5-one

Following the procedure of example 1(a) but substituting an equivalent amount of benzocyclohepten-5-one for the indanone one obtains 6,7,8,9-tetrahydro-6-(phenylmethylene)-5H-benzocyclohepten-5-one.

b.
4,5,6,7-Tetrahydro-4-phenyl-3H-benzo[6,7]cyclohepta[1,2-d]-pyrimidin-2-amine; hydrochloride (1:1)

Treating the product from part (a) according to the procedure of example 1(b), one obtains 4,5,6,7-tetrahydro-4-phenyl-3H-benzo[6,7]cyclohepta[1,2-d]pyrimidin-2-amine, hydrochloride (1:1).

EXAMPLES 5–18

Following the procedure of example 1 but substituting for the benzaldehyde in part (a) the aldehydes shown in Column A one obtains the products shown in Column B wherein Ar is the radical listed below.

Col. A

Ar-CHO

Col. B

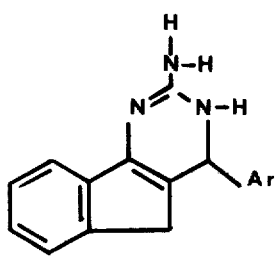

| Ex. | |
|---|---|
| 5 |  F |
| 6 | |
| 7 | |
| 8 | |
| 9 | |
| 10 | |
| 11 | |
| 12 | |
| 13 | |
| 14 | |
| 15 | |
| 16 | |
| 17 | |
| 18 | |

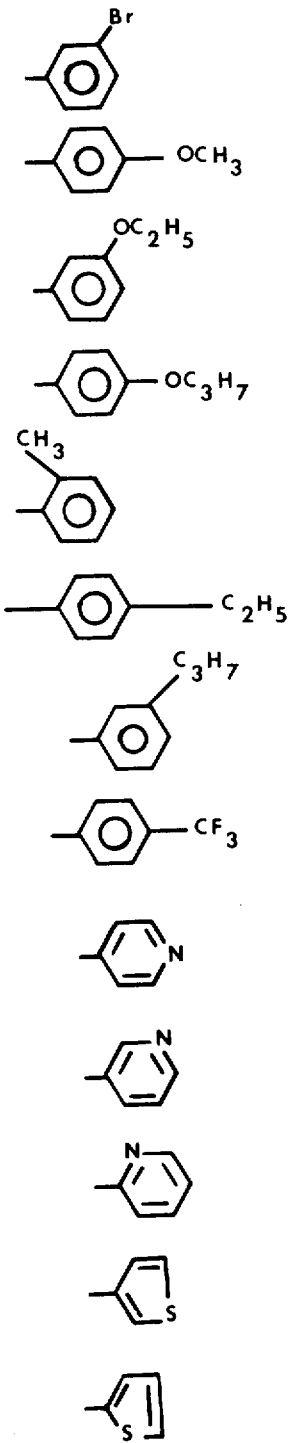

Similarly by employing the aldehydes of examples 5 to 18 within the procedure of examples 2 or 4 other compounds within the scope of the invention are obtained.

EXAMPLES 19–33

Following the procedure of example 1 but substituting for the guanidine in part (b) the substituted-guanidines shown in Column A one obtains the products shown in Column-B wherein $R_1$ and $R_2$ are the radicals listed below.

B wherein $X_1$, $X_2$, $X_3$ and $X_4$ are the radicals listed below.

| Col. A | Col. B |
|---|---|
| (structure with $X_1, X_2, X_3, X_4$ on indanone) | (structure with $X_1, X_2, X_3, X_4$ on fused pyrimidine-indane-phenyl) |

| Ex. | $X_1$ | $X_2$ | $X_3$ | $X_4$ |
|---|---|---|---|---|
| 34 | Cl | H | H | H |
| 35 | H | F | H | H |
| 36 | H | H | Br | H |
| 37 | H | H | H | F |
| 38 | H | H | H | Cl |
| 39 | H | Cl | H | H |
| 40 | $CH_3$ | H | H | H |
| 41 | H | $C_2H_5$ | H | H |
| 42 | H | H | $CH_3$ | H |
| 43 | H | H | H | i—$C_3H_7$ |
| 44 | H | H | H | $CF_3$ |
| 45 | $OC_2H_5$ | H | H | H |
| 46 | H | $OC_3H_7$ | H | H |
| 47 | H | H | H | $OCH_3$ |

| Col. A | Col. B |
|---|---|
| (guanidine structure $H_2N-C(=NH)-N(R_1)-R_2$) | (pyrimidine-indane-phenyl structure with $R_1, R_2$) |

| Ex. | $R_1$ | $R_2$ |
|---|---|---|
| 19 | —$CH_3$ | H |
| 20 | —$C_2H_5$ | H |
| 21 | —n—$C_3H_7$ | H |
| 22 | —i—$C_3H_7$ | H |
| 23 | —n—$C_4H_9$ | H |
| 24 | —i—$C_4H_9$ | H |
| 25 | —t—$C_4H_9$ | H |
| 26 | —$CH_3$ | —$CH_3$ |
| 27 | —$C_2H_5$ | —$CH_3$ |
| 28 | —$C_2H_5$ | —$C_2H_5$ |
| 29 | —n—$C_3H_7$ | —n—$C_3H_7$ |
| 30 | —n—$C_3H_7$ | —$CH_3$ |
| 31 | —n—$C_4H_9$ | —n—$C_4H_9$ |
| 32 | —n—$C_4H_9$ | —$C_2H_5$ |
| 33 | —n—$C_4H_9$ | —$CH_3$ |

Similarly, by employing the substituted-guanidines of examples 19 to 33 in the procedures of examples 2 and 4 to 18, other compounds within the scope of the invention are obtained.

EXAMPLES 34–47

Following the procedure of example 1 but substituting for the indanone the substituted-indanones listed in Column A, one obtains the products shown in Column B wherein $X_1, X_2, X_3$ and $X_4$ are the radicals listed below.

Similarly, by employing the substituted-indanones of examples 34 to 47 within the procedures of examples 3 and 5 to 33 other compounds within the scope of the invention are obtained.

Also, by following the procedure of example 2 but substituting for the α-tetralone the substituted tetralone

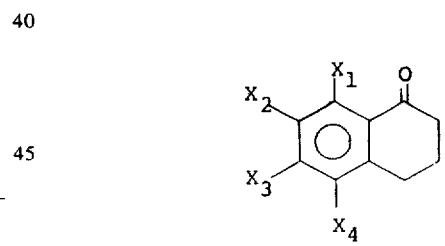

or by following the procedure of example 4 but employing the substituted-benzocyclohepten-5-one

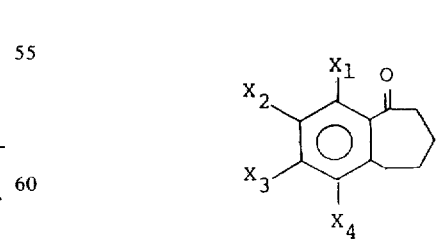

wherein $X_1$, $X_2$, $X_3$ and $X_4$ are as listed in examples 34 to 47, the substituted aldehydes of examples 3 and 5 to 18, and the substituted guanidines of examples 19 to 33, other compounds within the scope of the invention are obtained.

EXAMPLE 48

4,5-Dihydro-4-phenyl-3H-indeno[1,2-d]pyrimidin-2-amine, N-oxide

The hydrochloride salt from example 1 is basified by treatment with $K_2CO_3$. A solution of the free base in ethanol is treated with two equivalents of 30% $H_2O_2$. The solution is allowed to stand for 2 days and the solvent is removed under reduced pressure to give 4,5-dihydro-4-phenyl-3H-indeno[1,2-d]-pyrimidin-2-amine, N-oxide.

What is claimed is:

1. A compound of the formula:

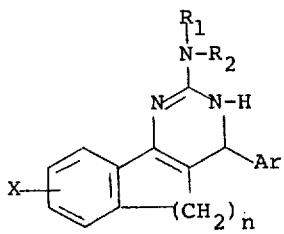

wherein X is selected from the group consisting of hydrogen, alkyl of 1 to 3 carbons, alkoxy of 1 to 3 carbons, halogen, and trifluoromethyl; $n$ is 1, 2 or 3; Ar is selected from the group consisting of X-monosubstituted phenyl wherein X is as defined above, pyridyl, and thienyl; and $R_1$ and $R_2$ are independently selected from the group consisting of hydrogen and straight or branched chain alkyl of 1 to 4 carbons provided that wherein $R_1$ and $R_2$ are both alkyl, the alkyl chains are straight of 1 to 4 carbons; and the pharmaceutically acceptable acid-addition salts and N-oxides thereof.

2. The compound of claim 1 wherein X is selected from the group consisting of hydrogen, Cl, F, methyl, methoxy, and trifluoromethyl; Ar is X-monosubstituted phenyl wherein X is as defined above; and $R_1$ and $R_2$ are independently selected from the group consisting of hydrogen, methyl and ethyl.

3. The compound of claim 2 wherein $n$ is 1.

4. The compound of claim 3 having the name 4,5-dihydro-4-phenyl-3H-indeno[1,2-d]pyrimidin-2-amine, hydrochloride (1:1).

5. The compound of claim 3 having the name 4-(4-chlorophenyl)-4,5-dihydro-3H-indeno[1,2-d]pyrimidin-2-amine, hydrochloride (1:1).

6. The compound of claim 2 wherein $n$ is 2.

7. The compound of claim 6 having the name 3,4,5,6-tetrahydro-4-phenylbenzo[h]quinazolin-2-amine, hydrochloride (1:1).

8. The compound of claim 2 wherein $n$ is 3.

9. The compound of claim 8 having the name 4,5,6,7-tetrahydro-4-phenyl-3H-benzo[6,7]cyclohepta[1,2-d]pyrimidin-2-amine, hydrochloride (1:1).

* * * * *